US010703462B2

(12) United States Patent
Harrington et al.

(10) Patent No.: US 10,703,462 B2
(45) Date of Patent: Jul. 7, 2020

(54) FLIGHT CONTROL SYSTEM REGENERATIVE BRAKING

(71) Applicant: HAMILTON SUNDSTRAND CORPORATION, Charlotte, NC (US)

(72) Inventors: Erik Harrington, Machesney Park, IL (US); Victor Barger, Lake in the Hills, IL (US); Adam M. Finney, Rockford, IL (US); Timothy Michael Mayer, Belvidere, IL (US); Yuniya S. Bishop, Dixon, IL (US); Adam Crandall, Winnebago, IL (US); Darrell E. Ankney, Dixon, IL (US); Eugene W. Dolfi, Rockford, IL (US); Michael C. Harke, DeForest, WI (US); Christian Miller, Beloit, WI (US); Artemio Pérez, Loves Park, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 287 days.

(21) Appl. No.: 15/686,560

(22) Filed: Aug. 25, 2017

(65) Prior Publication Data

US 2019/0061531 A1 Feb. 28, 2019

(51) Int. Cl.
*B64C 13/24* (2006.01)
*B60L 7/18* (2006.01)
(Continued)

(52) U.S. Cl.
CPC ............... *B64C 13/24* (2013.01); *B60L 7/18* (2013.01); *B64C 13/50* (2013.01);
(Continued)

(58) Field of Classification Search
CPC ....... B64C 13/24; B64C 13/30; B64C 13/341; B64C 13/343; B64C 13/345
(Continued)

(56) References Cited

U.S. PATENT DOCUMENTS 3,969,661 A 7/1976 Morinaga et al.
6,288,508 B1 * 9/2001 Taketomi ................ B60L 7/26
318/376
(Continued)

FOREIGN PATENT DOCUMENTS

RU 2598926 C1 10/2016
WO 2013015791 A1 1/2013

OTHER PUBLICATIONS

European Search Report for Application No./Patent No. 18190434.3-1010 dated Feb. 1, 2019; 7pgs.

*Primary Examiner* — Nicholas McFall
(74) *Attorney, Agent, or Firm* — Cantor Colburn LLP

(57) ABSTRACT

A method for braking a motor in a high lift system of an aircraft, the high lift system comprising a central power drive unit for moving high lift surfaces arranged at a wing through providing rotational power by means of a transmission shaft to a plurality of drive stations operably coupled with the high lift surfaces; which power drive unit is operatively coupled to a controller and comprises at least one electric motor coupled therewith. The method includes determining a braking requirement for the at least one electric motor, measuring at least one of a current command to the motor and a current speed and direction of the at least one electric motor, based on the braking requirement, applying a braking command to the at least one electric motor, and reducing the braking command as the at least one electric motor comes to rest.

18 Claims, 3 Drawing Sheets

(51) Int. Cl.
*B64D 45/00* (2006.01)
*H02P 3/02* (2006.01)
*H02P 3/20* (2006.01)
*B64C 13/50* (2006.01)
*H02P 3/14* (2006.01)
*H02P 3/22* (2006.01)
*H02P 3/26* (2006.01)
*H02P 3/08* (2006.01)

(52) U.S. Cl.
CPC .......... *B64D 45/0005* (2013.01); *H02P 3/025* (2013.01); *H02P 3/08* (2013.01); *H02P 3/14* (2013.01); *H02P 3/20* (2013.01); *H02P 3/22* (2013.01); *H02P 3/26* (2013.01); *H02P 2207/05* (2013.01)

(58) Field of Classification Search
USPC .................................................. 318/375, 376
See application file for complete search history.

(56) References Cited

U.S. PATENT DOCUMENTS

| | | |
|---|---|---|
| 9,246,417 B1 | 1/2016 | Connolly et al. |
| 2009/0302153 A1 | 12/2009 | Matasso et al. |
| 2010/0109581 A1 | 5/2010 | Sheahan, Jr. et al. |
| 2012/0138751 A1 | 6/2012 | Richter et al. |
| 2013/0261852 A1* | 10/2013 | Recksiek ................ B64C 13/30 701/3 |
| 2014/0034781 A1 | 2/2014 | Kouros et al. |
| 2016/0052626 A1 | 2/2016 | Vander Mey |

* cited by examiner

FLIGHT CONTROL SYSTEM REGENERATIVE BRAKING

TECHNICAL FIELD

This disclosure relates to a method for controlling and braking actuators in an aircraft.

BACKGROUND

Typically, high lift systems of commercial and military aircraft are powered by a centralized drive, also known as a power drive unit (PDU). Such drives are mounted in a central region of the fuselage and are controllable through a computerized control system or electronics unit. The PDU is coupled with a torque shaft system, also known as transmission shaft, which transfers mechanical power to geared actuators at flap or slat panel drive stations distributed along the trailing edge or leading edge of a wing. The control of the PDU is usually conducted by control computers, such as slat flap electronic control computers/unit (SFECU), which are commonly realized as a redundant arrangement of at least two independent SFECUs that are not only able to control but also to monitor the operation of the high lift system.

The PDU commonly comprises two independent motors that may be hydraulic or electric, which may be coupled with an output shaft by means of a speed summing differential gear. Each of the motors is commonly provided with a power off brake (POB) (typically an electromechanical brake) for arresting the motor in a commanded position. In some systems, while at least one of the two motors is commonly a hydraulic motor, the second motor may be realized as an electric motor, leading to a hybrid PDU. A wing tip brake, which is coupled with the transmission shaft and particularly placed in an outer region of the transmission shaft and/or in a tip region of the respective wing, is also capable of arresting and holding the transmission shaft. Each of the wing tip brakes are power off brake (POB) which arrest the system in an existing position.

Still further, high lift systems usually comprise torque limiters that are adapted for limiting the torque to be introduced into the transmission system. The torque limiters may be mechanical or electronic torque limiters, wherein the latter rely on constantly monitoring an introduced torque, taking authority over the motors of the PDU, and initiating limitation and/or a reversal once the torque exceeds a predetermined threshold. The torque limiters can be separate elements or integrated into the PDU.

High-lift systems often rely on specific brake engagement response times to mitigate failure scenarios such as un-commanded motion, asymmetry and flap/slat panel skew. In such failure scenarios if a monitored parameter of the system is found to be out of an acceptable range, the high-lift system annunciates the failure condition and commands the system brakes to engage preventing further motion. System parameters and functions such as threshold values, fault monitoring, fault persistence, brake electrical control circuits, and the brake itself all contribute to the overall response time of the brake to arrest the system. Moreover, brake systems can develop degraded performance over life due to electrical variations, mechanical wear and environmental exposure all of which will increase the brake's engagement response time. Degraded brake response times may prevent or degrade a high-lift system from mitigating a given failure scenario resulting in risk to the aircraft. As such, the need for improved actuator brake response time to arrest motion as a system without the need for ground test equipment would be a useful tool in mitigating certain failure modes.

BRIEF DESCRIPTION

According to one embodiment of the invention, described herein is an improved braking system and method for a high lift system. The system including a plurality of high lift surfaces movably arranged at a wing, a plurality of drive stations coupled with the high lift surfaces via a transmission shaft, a power drive unit coupled with the transmission shaft including an electric motor incorporating regenerative braking and optionally operably coupled with an electromechanical brake, and a control unit operably coupled to the power drive unit. The control unit executing a method regeneratively controlling an electric motor, acquiring a sensor output of a sensor coupled during the actuating of the motor and determining a motion of the motor, activating a regenerative braking function as needed to arrest the motion under selected conditions.

Also described herein in an embodiment is a method for braking a motor in a high lift system of an aircraft, the high lift system comprising a central power drive unit for moving high lift surfaces arranged at a wing through providing rotational power by means of a transmission shaft to a plurality of drive stations operably coupled with the high lift surfaces; which power drive unit is operatively coupled to a controller and comprises at least one electric motor coupled therewith. The method includes determining a braking requirement for the at least one electric motor, measuring at least one of a current command to the motor and a current speed and direction of the at least one electric motor, based on the braking requirement, applying a braking command to the at least one electric motor, and reducing the braking command as the at least one electric motor comes to rest.

In addition to one or more of the features described above, or as an alternative, further embodiments may include that the braking command comprising at least one of a command of substantially equivalent magnitude and opposite direction or torque and a command for substantially equivalent speed and opposite direction to that of the current command.

In addition to one or more of the features described above, or as an alternative, further embodiments may include dissipating energy regenerated from the at least one motor by shunting a DC bus under selected conditions.

In addition to one or more of the features described above, or as an alternative, further embodiments may include that the shunting is controlled by a controller operably connected to a regenerative bus monitor.

In addition to one or more of the features described above, or as an alternative, further embodiments may include that the selected conditions include the braking requirement for the at least one motor.

In addition to one or more of the features described above, or as an alternative, further embodiments may include that the selected conditions include the arresting motion of one or more high lift surfaces of the high-lift system.

In addition to one or more of the features described above, or as an alternative, further embodiments may include applying a braking command to a power off brake, the power off brake operably coupled to at least one of the at least one electric motor and the control unit.

In addition to one or more of the features described above, or as an alternative, further embodiments may include that the power off brake holds the high lift surfaces of the high-lift system in a fixed position.

Also described herein, in an embodiment is a high lift system of an aircraft. The high-lift system including a plurality of high lift surfaces movably arranged at a wing, a plurality of drive stations coupled with the high lift surfaces, a transmission shaft coupled with the plurality of drive stations, and a power drive unit coupled with the transmission shaft for moving the high lift surfaces, the power drive unit comprising at least one electric motor. The high-lift system also includes a control unit, the control unit operably coupled to the power drive unit, the control unit configured to execute a method for regeneratively braking the at least one electric motor. The method including measuring at least one of a current command to the motor and a current speed and direction of the at least one electric motor, based on the braking requirement, applying a braking command to the at least one electric motor, the braking command comprising at least one of a command of substantially equivalent magnitude and opposite direction, a command for substantially equivalent speed and opposite direction, and a command for substantially equivalent torque and opposite direction to that of the current command, and reducing the braking command as the at least one electric motor comes to rest.

In addition to one or more of the features described above, or as an alternative, further embodiments may include a regenerative bus monitor operably connected to the control unit and a DC bus configured to provide energy to the at least one motor.

In addition to one or more of the features described above, or as an alternative, further embodiments may include that the regenerative bus monitor is configured to shunt the DC bus under selected conditions, thereby dissipating energy regenerated from the at least one motor.

In addition to one or more of the features described above, or as an alternative, further embodiments may include that the selected conditions include the braking requirement for the at least one motor.

In addition to one or more of the features described above, or as an alternative, further embodiments may include that the selected conditions include the arresting motion of one or more high lift surfaces of the high-lift system.

In addition to one or more of the features described above, or as an alternative, further embodiments may include a power off brake, the power off brake operably coupled to at least one of the at least one electric motor and the control unit.

In addition to one or more of the features described above, or as an alternative, further embodiments may include that the power off brake holds the high lift surfaces of the high-lift system in a fixed position.

In addition to one or more of the features described above, or as an alternative, further embodiments may include that the high lift surfaces are at least one of trailing edge flaps and leading edge slats.

In addition to one or more of the features described above, or as an alternative, further embodiments may include that the at least one electric motor is a brushless DC motor.

Also described herein is a high lift system of an aircraft, including a plurality of high lift surfaces movably arranged at a wing, a plurality of drive stations coupled with the high lift surfaces, a transmission shaft coupled with the plurality of drive stations, a power drive unit coupled with the transmission shaft for moving the high lift surfaces, the power drive unit comprising at least one electric motor, and a motor drive system operatively coupled to the at least one electric motor, the motor drive system including a regenerative monitor apparatus configured shunt a DC bus of the motor drive system. The system also includes a control unit, the control unit operably coupled to the motor drive, the control unit operably controlling the regenerative monitor apparatus to brake the at least one electric motor under selected conditions.

In addition to one or more of the features described above, or as an alternative, further embodiments may include that the regenerative bus monitor is configured to shunt the DC bus under selected conditions, thereby dissipating energy regenerated from the at least one motor.

In addition to one or more of the features described above, or as an alternative, further embodiments may include that the selected conditions include at least one of the braking requirement for the at least one motor and arresting motion of one or more high lift surfaces of the high-lift system.

In addition to one or more of the features described above, or as an alternative, further embodiments may include a power off brake, the power off brake operably coupled to at least one of the at least one electric motor and the control unit.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
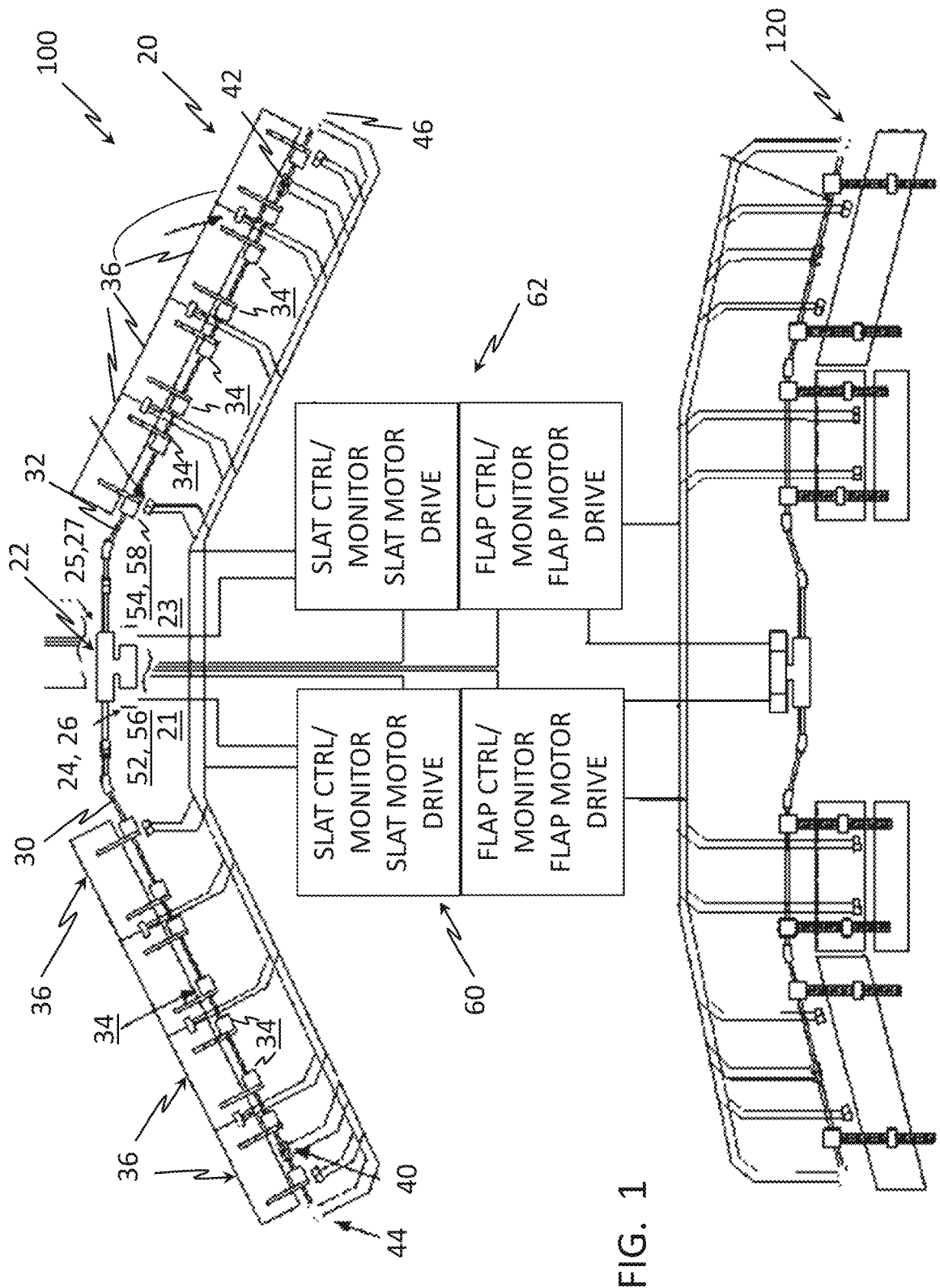
FIG. 1 depicts a simplified system schematic of high-lift system on an aircraft as employed in the embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to a system level approach to control of actuators and actuator braking in a high-lift system. The disclosure can also be applicable to other systems including, but not limited to, horizontal stabilizers, utility actuators, and the like, which rely on a brake response time as a critical function of its operating performance.

Speed and positional control of current high-lift flight control systems is still highly variable, requiring fairly large margins for accuracy. As designs drive tighter tolerances and systems become more compact, accuracy margins continue to tighten accordingly to ensure desirable control system response. As a result, this trend will require even greater capability in accurate system control and braking. This is especially critical during emergency shut down situations where an immediate stoppage of the flight control system, and thereby the control surfaces is the ideal.

In FIG. 1, a general setup of a high lift system 100 is shown in an exemplary leading edge slat system 20 and trailing edge flap system 120. While the description provided herein and depicted in FIG. 1 is directed to an exemplary leading edge slat system, it should be readily appreciated that it is equally applicable to the trailing edge flap system 120 without any loss of generality. For better understanding of the described embodiments and simplification of the figures and description further detail with respect to the trailing edge flap system 120 has been omitted to avoid repetition.

A power drive unit (PDU) 22 comprises a plurality of motors 24, 25 The motors 24/25 can be electric or hydraulic motors. In an embodiment two electric motors 24, 25 are in employed on each PDU 22, but various numbers of motors may be employed depending on the needs of the application. Further, while electric motors are described it should also be appreciated that the description provided herein is equally applicable to hydraulic motors without any loss of generality. Conventionally, a power off brake 26, 27 is coupled with each of the electric motor(s) 24, 25 respectively, as a means to stop and maintain PDU output. In one or more embodiment as described herein, each motor 24, 25 can include a power off brake 26, 27. However, in an embodiment, the braking function of the power off brake 26, 27 is incorporated into the regenerative braking functionality of the motors 24, 25 of the PDU as will be described in further detail herein. The PDU outputs are coupled, through the PDU, to a transmission shaft system 30, 32 that extends along the leading edge of each wing. Each of the transmission shafts 30, 32 is coupled with several drive stations 34 distributed along the respective wing half, wherein each of a plurality of movably supported high lift surfaces 36 is driven by two or more individual drive stations 34. In the figure, four high lift surfaces 36 (e.g., slats) are depicted for each wing half, though any number may be employed.

Each of the transmission shafts 30, 32 also includes a wing tip brake 40, 42 in a region around the outer end of each of the shafts 30, 32, which may be at an outer end of the respective wing. Typically, the location of the wingtip brake 40, 42, is at the end of the driveline. However, some applications may require the wingtip brake 40, 42 to be installed inboard of the most outboard actuator due to restrictions in envelope, structure, and the like at the end of the wing. Also, each transmission shaft 30, 32 is coupled with an position sensor 44, 46 arranged at an outermost end of the respective shaft 30, 32. The sensors provide position feedback of the system. The feedback can allow, for example, the detection of asymmetry conditions between the transmission shafts 30, 32 and, respectively, the drive stations 34 of both wing halves.

The system 100 may further comprise a feedback position sensor or pickoff unit 52, 54 that allows monitoring the of the transmission shafts 30, 32 at or near the output of the PDU 22. Torque sensor units 56, 58 arranged at the transmission shafts 30, 32 or within the PDU 22, monitor the torque that is introduced into the transmission shafts 30, 32. All of the position pickoff units 44, 46, the feedback position pickoff unit 52, 54, and the torque sensor units 56, 58 are coupled with two control units 60, 62, which are exemplarily realized as a first slat flap electronic control unit (SFECU) 60 and a second SFECU 62. While identified separately for the purposes of description of the embodiments herein, it should be appreciated that the PDU 22 and SFECU 60, 62 could be integrated or their functions redistributed.

The torque in the transmission shafts 30, 32 of each wing is exemplarily limited through a torque limiter (TL) functionality, in which the torque sensor units 54, 56 detect the introduced torque. If the torque in one of the transmission shafts 30, 32 exceeds a certain torque threshold the PDU 22 is either stopped or, in some embodiments, a rapid speed decrease or reversal of the PDU motors 24, 26 is conducted, leading to controlling the torque to an uncritical level. Finally, the system 100 may be arrested through engaging the regenerative braking function associated with each of the motors 24, 25. The electric motors 24, 25 may be a brushless direct current (BLDC) motors controlled through a digital drive control, coupled with the SFECUs 60 and 62. Optionally, the system 100 may also be arrested through engaging the optional power off brake 26, 27 associated with each of the motors 24, 25 and/or the asymmetry or wing tip brakes 40, 42.

In a default high lift operating mode, the optional wing tip brakes 40, 42 and motor brakes 26, 27 are released and the motors 24, 25, controlled by SFECUs 60, 62, provides power to the PDU 22, which provides sufficient mechanical power to operate the high lift system 100 at a commanded speed into any commanded position. Once near the commanded position the SFECUs 60, 62 decelerate the motors 24, 25 reducing the output of the PDU 22 to decelerate the high lift system 100. Once at the commanded position the regenerative braking functions of the SFECUs 60, 62 provides commands to the motors 24, 25 to stop and hold the position of the high lift system 100. Optionally, in an embodiment, at the commanded position the optional power off brakes 26, 27 are engaged to stop and hold the position of the high lift system 100. Under selected conditions, the high-lift system 100 and in particular the SFECUs 60, 62, are required to stop the motion of the motor 24, 25 as quickly as possible. Under these conditions, the SFECUs 60, 62, employ a regenerative braking control function, reversing commands to the motors 24, 25 to arrest its motion as rapidly as possible.

Figure 2:
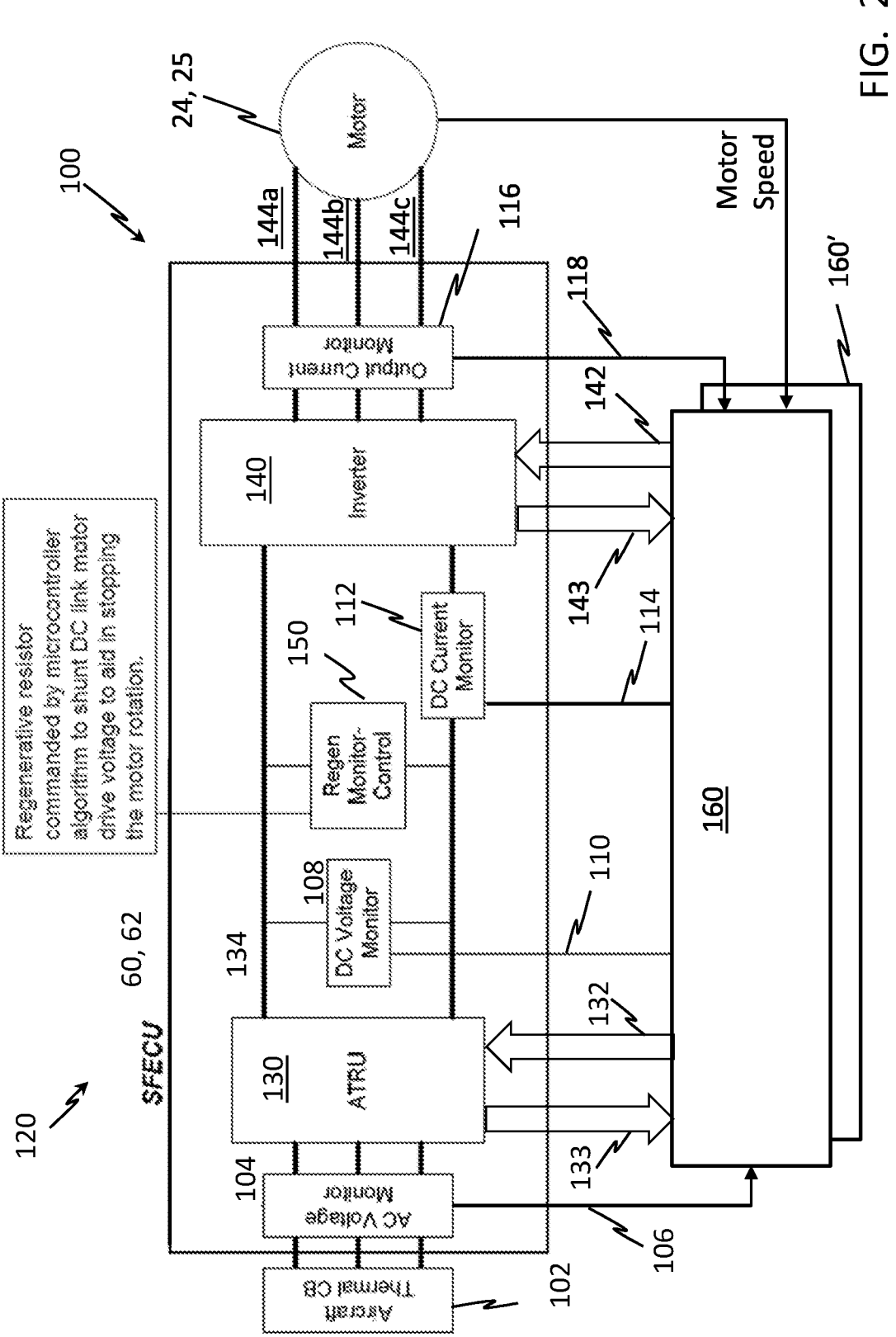
FIG. 2 depicts a simplified block diagram of a regenerative controls system in accordance with an embodiment.

FIG. 2 depicts a simplified block diagram of the SFECUs 60, 62. In an embodiment, the SFECUs 60, 62 include both a power system 100 and one or more motor controllers. In an exemplary embodiment, the power system 100 includes an AC power source 102, such as an electrical main line (e.g., 115 Volts AC, 440 Volts AC, 1-phase or 3-phase, primary aircraft bus labeled aircraft thermal CB in the figure). The AC power 102 is provided to a motor drive system 20. As described in further detail herein, drive system 120 includes a rectifier or converter 130 labeled and hereinafter identified as ATRU (auto transformer rectifier unit) to convert the AC power from the bus 102 to a DC voltage on DC bus 1. In an embodiment, the rectifier/ATRU 132 also includes a voltage level shifting function to step up the AC voltage 102 to a higher voltage. The higher voltage permits establishing a DC bus voltage at a higher voltage then the peak AC voltage of the AC power 102. The level shifting function may be implemented by a transformer or conventional active techniques for level shifting. The ATRU 130 may also include a rectification function to convert the level shifted AC power to a DC voltage. In an embodiment the ATRU 130 employs active rectification. The ATRU 130 can be an active or passive configuration and may include other functions and features such as active rectification, active or passive filtering for Electromagnetic Interference (EMI) and the like. The drive system 120 also includes an inverter 140, to convert the DC voltage formulated by the ATRU 130 to multiphase, AC drive signals 144a, 144b, 144c to drive a motor 24, 25. Drive signals 144a, 144b, 144c from the drive system 120 are supplied to the motor 24, 25 to operate the load e.g., aerodynamic loads on the high-lift control surfaces 36 e.g., slats, flaps and so on. In an exemplary embodiment, motor 24, 25 includes a multiphase, permanent magnet motor, or more specifically a Brushless DC Motor (BLDC).

As shown in FIG. 2, the drive system 120 includes ATRU 132 and inverter 140 connected to provide drive signals 144a, 144b, 144c to motor 24, 25. In an embodiment both the ATRU 130 and inverters 140 are controlled by a controller 160. In an alternative embodiment the ATRU 130 and the inverter 140 are controlled by a separate drive controller, 160 and 160', respectively. Drive controllers 160 (and 160') provide control signals 132 to the ATRU 130 to control operation of the ATRU 130 and generation of the DC bus 134. The ATRU 130 may provide several sensor signals 133 to the controller 160, 160' to facilitate level shifting the AC voltage from the AC power source 102 as well as rectification and generation of the DC voltage on the DC bus 134. Sensor signals may include information of the active rectification in the ATRU and the switching devices employed to facilitate the rectification. Sensor signals 133 may include, but not be limited to status of the switching devices, operation of the switching devices, temperature of the switching devices and the like.

Likewise, the controllers 160 (and 160') provide control signals 142 to the inverter 140 to control generation of the drive signals 144a, 144b, 144c to motor 24, 25. The inverter 140 may provide several sensor signals 143 to the controller 160, 160' to facilitate generation of the control signals 142 to the inverter 140 and ultimately the motor drive signals 144a, 144b, 144c. Sensor signals from the inverter 140 may include information of the operation of the switching devices employed to facilitate the pulse width modulation (PWM) generation of the motor drive signals 144a, 144b, 144c. Sensor signals 143 may include, but not be limited to status of the switching devices, operation of the switching devices, temperature of the switching devices and the like. Drive controllers 160, 160' may be implemented using a general-purpose microprocessor executing a computer program stored on a storage medium to perform the operations described herein. Alternatively, drive controllers 160, 160' may be implemented in hardware (e.g., ASIC, FPGA) or in a combination of hardware/software.

Drive 120 may further include an AC voltage monitor 104 for measuring and monitoring the incoming AC voltage from the aircraft AC power source 102. The voltage monitor 104 may be any variety of sensor operably connected to the controller 160, 160' or just a direct input to the controller 160, 160' for further processing as shown by line 106. In an embodiment, the AC voltage monitor 104 facilitates sensing open phases of the AC power source 102 and over/under voltage of the AC power source 102. Likewise drive 120 may further include a DC voltage monitor 108 for measuring and monitoring the DC voltage for the DC bus 134. The DC voltage monitor 108 may be any variety of sensor operably connected to the controller 160, 160' or just a direct input to the controller 160, 160' for further processing as shown by line 110. In an embodiment, the DC voltage monitor 108 facilitates sensing over/under voltage of the DC bus 134.

In addition, drive 120 may further include a DC Current monitor 112 for measuring and monitoring the total DC current for the DC bus 134. The DC current monitor 112 may be any variety of sensor or sensor operably connected to the controller 160, 160' or just a direct input to the controller 160, 160' for further processing as shown by line 114. In an embodiment, the DC current monitor 112 facilitates sensing over/under current circulating on the DC bus 134. Finally, drive 120 may further include an output or phase current monitor 116 for measuring and monitoring the individual phase currents for the motor 24, 25. The output current monitor may be any variety of sensor or sensors operably connected to the controller 160, 160' or just a direct input to the controller 160, 160' for further processing as shown by line 118. In an embodiment, the output current monitor 116 facilitates sensing over current or imbalanced currents being supplied to the motor 24, 25.

Continuing now with FIG. 2 for discussion of the operation of the motor drive 120. In a motor application, operating characteristics for the motor 24, 25 such as motor speed, torque and the like may be measured and provided to the controller 160. One or more of the bus monitor sensors 104, 108, and 112 monitor the level of voltage on the AC bus 102 and/or DC main power bus 134 and generates a corresponding voltage feedback signal on lines 106 or 110 representative of its respective voltage level. As is conventional with DC motor drives 120, the AC power from the grid or AC power source 102 can also be converted to the DC power and then again inverted to the AC power of different frequency and different voltage level for operation of the motor 24, 25.

In an embodiment, to control and drive the motor 24, 25, controller 160 receives a main power voltage reference signal and compares it to the main power voltage feedback signal to generate a voltage difference signal representative of the difference between them. A voltage feedback proportional-plus-integral (PI) control function is employed and receives the voltage difference signal and converts it to a stable control current reference. Likewise, a current comparator function in controller 160 compares the control current reference with the control current feedback signal to generate a current difference. A control current feedback PI controller function receives the current difference and converts it to a stable control current.

A pulse width modulator (PWM) function receives the control current regulating signal and generates corresponding PWM control signals on a PWM control signals 142 to the inverter 140. The controller regulates the PWM control signals 142 to produce a level of the control current on the as measured by the DC current monitor 112 responsive to the voltage feedback and a control current feedback functions.

In an exemplary embodiment, the controller 160 executes a method for controlling the position or speed of the motor 24, 25 as needed to maintain the high-lift control surfaces 36 in a desired position. Under selected conditions, it may be desirable to control the actuator, and thereby the high-lift control surface 36 motion or arrest it motion very rapidly. For example, under a failure condition, to arrest the motion of a high-lift control surface 36 (FIG. 1) and prevent further motion. Under normal operation, the inverter 140, based on the PWM control signals generates phase excitation control signals applied to the motor 24, 25. When the motor 24, 25 is commanded to stop, typically the excitation signals are removed. However, because of the electromagnetic energy and kinetic energy in the motor 24, 25, the motor 24, 25 will continue to coast pushing electromagnetic energy back to the drive 120 and DC bus 134 (until a power off brake TBD arrests the motion of the motor 24, 25 or all the electromagnetic energy in the motor 24, 25 is dissipated through the inverter 140 and DC bus 134 as well any other components of the drive 120. This dissipation takes time, actuation of a power off brake also takes time to arrest the motion of a controls surface. Moreover, system parameters and functions such as threshold values, fault monitoring, fault persistence, brake electrical control circuits, and the brake itself all contribute to the overall response time of the brake to arrest the system. Degraded brake response times may prevent or degrade a high-lift system from mitigating a given failure scenario resulting in risk to the aircraft.

To that end, in an embodiment, the controller 160 executes a method of regenerative braking as part of the motor control functionality to precisely control the positioning and braking of the motor 24, 25 and thereby the high-lift control surface 36. In an exemplary embodiment, a regenerative braking scheme is employed where under selected conditions a regenerative monitor control 150 is employed across the DC bus 134. The regenerative monitor control 150 is operably connected to the controller 160 and is commanded to shunt energy in the DC bus 134 under selected conditions. Shunting the energy is the DC bus 134 aids in dissipating the energy developed and pushed back to the DC bus 134 during braking. One condition for shunting energy is braking and stopping the motor 24, 25. Another condition might include an emergency or rapid stopping condition.

In another embodiment, the controller 160 executes a method 200 of regenerative braking as part of the motor control functionality to precisely control the positioning and braking of the motor 24, 25 and thereby the high-lift control surface 36. In this embodiment, a regenerative braking scheme is employed where under selected conditions the regenerative monitor control 150 is employed across the DC bus 134 as described above and rather than the inverter 140 not commanding the motor 24, 25 any further, a reciprocal command is made to further improve motor deceleration. In operation, under selected conditions, the controller 160 when a requirement for braking the motor 24, 25 is initiated, records the current commands 142 to the inverter 140. In an embodiment, command signals 142 to the inverter 140 are formulated to provide the same (magnitude) motor command signals 144a-c to the motor 24, 26 that will drive the motor 24, 25 in the opposite direction. As a result, the opposite command helps offset the energy in the motor 24, 25 and increases the deceleration of the motor 24, 25. The equal and opposite command signals to the motor 144a-c are maintained and reduced to zero as the motor 24, 25 decelerates and comes to rest. The regenerative monitor control 150 is still commanded to shunt energy in the DC bus 134, thereby decelerating the motor 24, 25. Shunting the energy is the DC bus 134 aids in dissipating the energy developed and pushed back to the DC bus 134 during braking.

Likewise, in another embodiment, under selected conditions, the controller 160 when a requirement for braking the motor 24, 25 is initiated, records the current and or torque commands 142 to the inverter 140. In an embodiment, command signals 142 to the inverter 140 are formulated to provide the same (magnitude) motor command signals 144a-c to the motor 24, 26 that will drive the motor 24, 25 with the opposite torque. As a result, the opposite command helps offset the energy in the motor 24, 25 and increases the deceleration of the motor 24, 25. The equal and opposite command signals to the motor 144a-c are maintained and reduced to zero as the motor 24, 25 decelerates and comes to rest. The regenerative monitor control 150 is still commanded to shunt energy in the DC bus 134, thereby decelerating the motor 24, 25. Shunting the energy is the DC bus 134 aids in dissipating the energy developed and pushed back to the DC bus 134 during braking.

Figure 3:
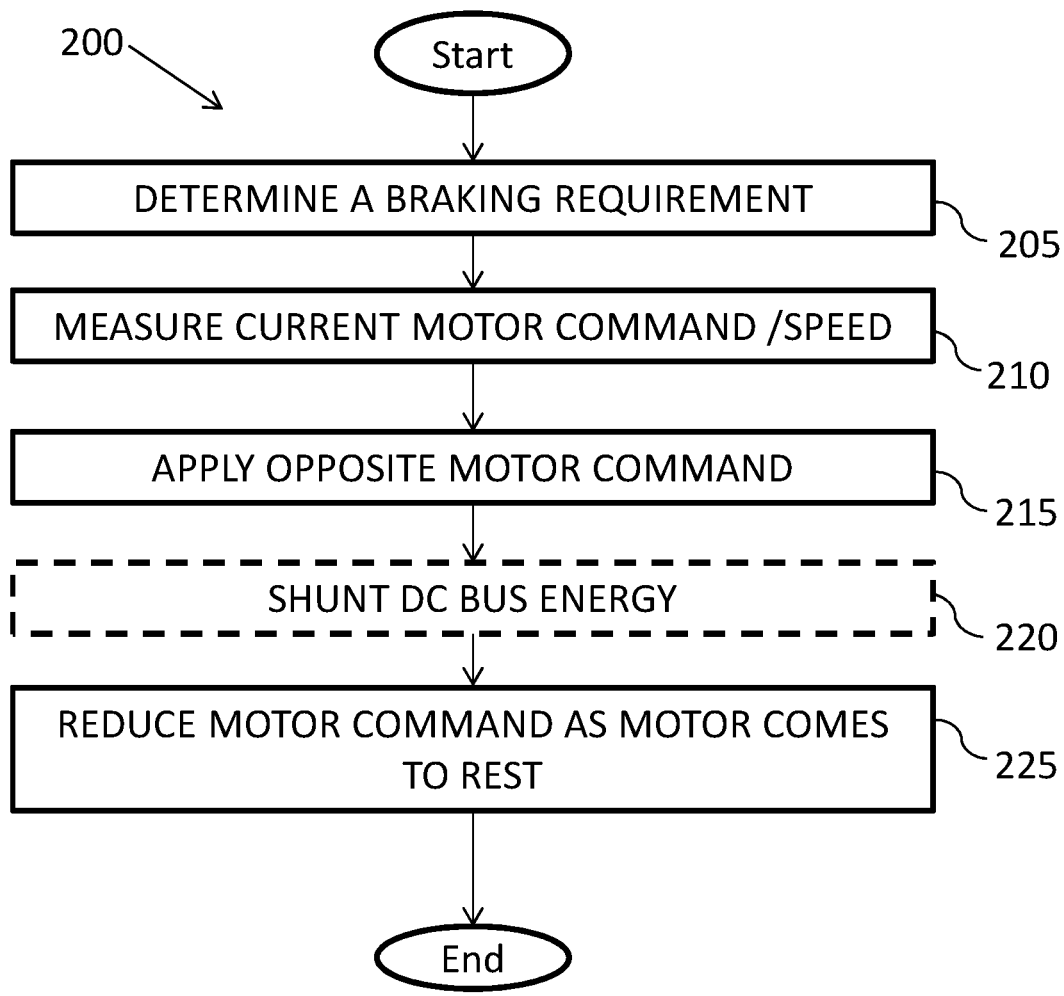
FIG. 3 is a flowchart of methods of measuring high-lift brake response time in accordance with an embodiment.

Turning now to FIG. 3 for depiction of the method 200 of regenerative deceleration of a motor 24, 25 in an aircraft high lift control system to reduce braking response time in accordance with an embodiment. In order to conduct the regenerative braking of the methodology 200 the method initiates at process step 205 with determining a braking requirement. The braking requirement may be the result of normal operation to stop the motor 24, 25, or it may be the result of an abnormal condition where it is desirable to arrest the motion of the motor 24, 25 as rapidly as possible. For example to avoid any further movement of an aircraft high-lift system control surface 36. Continuing with process step 210, when braking is required or desired, the controller 160 determines the current magnitude and direction of the motor command signals 144a-c. The controller 160 then applies excitation signals 142 equivalent to generate motor command signals 144a-c of equivalent magnitude and opposite direction as depicted at process step 215. Continuing with process step 220, optionally and/or alternatively the controller 160 may engage the regenerative monitor to assist in shunt the energy in the DC bus 134 as described above. Finally, the method 200 continues with the controller reducing the motor command signals as the motor 24, 25 comes to rest to avoid commanding the motor 24, 25 further as depicted at process step 225. In another embodiment, when braking is required or desired, the controller 160 determines the current torque, speed and direction of the motor 24, 25. The controller 160 then applies excitation signals 142 equivalent to generate motor command signals 144a-c of sufficient magnitude and opposite direction to overcome the current speed and torque. Once again, optionally and/or alternatively the controller 160 may also engage the regenerative monitor to assist in shunt the energy in the DC bus 134 as described above. Finally, the method 200 continues with the controller 160 reducing the motor command signals 144a-c as the motor 24, 25 comes to rest to avoid commanding the motor 24, 25 further as depicted at process step 225.

The commandment of the motor 24, 25, may be conducted for a brief duration, such as fractions of a seconds, e.g. less than one second, which allows the controller 160 and drive system 120 the time to reliably dissipate the energy in the motor 24, 25 and bring the system to rest very rapidly. In an embodiment, the threshold is application specific depending on the configuration of system 100, the motor 24, 25 the actuators inertia and its configuration, and the like. Different system and aircraft configurations may require different thresholds and times. Ultimately what is desired is that the system arrests motion prior to the high-lift control surface 36 e.g., a flap or slat moving an objectionable amount. One measure of an objectionable amount would be if the control surface moved enough to impact aircraft handling or flying quality.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for braking a motor in a high lift system of an aircraft, the method comprising:
   providing the high lift system, wherein the system includes a central power drive unit that includes at least one electric motor for moving high lift surfaces arranged at a wing through providing rotational power by means of a transmission shaft to a plurality of drive stations operably coupled with the high lift surfaces;
   operably coupling the power drive unit to a controller;
   determining a braking requirement for the at least one electric motor;
   measuring a magnitude of a motor command signal and a direction of the at least one electric motor;
   based on the braking requirement, applying a braking command to the at least one electric motor, the braking command comprising a command of substantially equivalent magnitude of the motor command signal that will drive the at least one electric motor in an opposite direction; and
   reducing the braking command as the at least one electric motor comes to rest.

2. The method of claim 1, further comprising dissipating energy regenerated from the at least one electric motor by shunting a DC bus under selected conditions.

3. The method of claim 2, wherein the shunting is controlled by a controller operably connected to a regenerative bus monitor.

4. The method of claim 2, wherein the selected conditions include the braking requirement for the at least one motor.

5. The method of claim 2, wherein the selected conditions include the arresting motion of one or more high lift surfaces of the high-lift system.

6. The method of claim 1, further including applying a braking command to a power off brake, the power off brake operably coupled to at least one of the at least one electric motor and the controller.

7. The method of claim 6, wherein the power off brake holds the high lift surfaces of the high-lift system in a fixed position.

8. A high lift system of an aircraft, comprising:
   a plurality of high lift surfaces movably arranged at a wing;
   a plurality of drive stations coupled with the high lift surfaces;
   a transmission shaft coupled with the plurality of drive stations;
   a power drive unit coupled with the transmission shaft for moving the high lift surfaces, the power drive unit comprising at least one electric motor operably; and
   a control unit, the control unit operably coupled to the power drive unit, the control unit configured to execute a method for regeneratively braking the at least one electric motor, the method including measuring magnitude of a motor control signal and a direction of the at least one electric motor, based on the braking requirement, applying a braking command to the at least one electric motor, the braking command comprising a command of substantially equivalent magnitude of the magnitude of motor command signal that will drive the at least one electric motor in an opposite direction, and reducing the braking command as the at least one electric motor comes to rest;
   the system further comprising a regenerative bus monitor operably connected to the control unit and a DC bus configured to provide energy to the at least one electric motor.

9. The system of claim 8, wherein the regenerative bus monitor is configured to shunt the DC bus under selected conditions, thereby dissipating energy regenerated from the at least one motor.

10. The system of claim 9, wherein the selected conditions include the braking requirement for the at least one motor.

11. The system of claim 9, wherein the selected conditions include the arresting motion of one or more of the plurality of high lift surfaces.

12. The system of claim 8, further including a power off brake, the power off brake operably coupled to at least one of the at least one electric motor and the control unit.

13. The system of claim 8, wherein the power off brake holds the high lift surfaces of the high-lift system in a fixed position.

14. The system of claim 8, wherein the high lift surfaces are at least one of trailing edge flaps and leading edge slats.

15. The system of claim 8, wherein the at least one electric motor is a brushless DC motor.

16. A high lift system of an aircraft, comprising:
   a plurality of high lift surfaces movably arranged at a wing;

a plurality of drive stations coupled with the high lift surfaces;

a transmission shaft coupled with the plurality of drive stations;

a power drive unit coupled with the transmission shaft for moving the high lift surfaces, the power drive unit comprising at least one electric motor;

a motor drive system operatively coupled to the at least one electric motor, the motor drive system including a regenerative monitor apparatus configured to shunt a DC bus of the motor drive system;

a control unit, the control unit operably coupled to the motor drive, the control unit operably controlling the regenerative monitor apparatus to brake the at least one electric motor under selected conditions; and a power off brake, the power off brake operably coupled to at least one of the at least one electric motor and the control unit.

17. The system of claim 16, wherein the system includes a regenerative bus monitor configured to shunt the DC bus under selected conditions, thereby dissipating energy regenerated from the at least one electric motor.

18. The system of claim 17, wherein the selected conditions include at least one of the braking requirement for the at least one motor and arresting motion of one or more of the plurality of high lift surfaces.

* * * * *